US011537448B1

(12) United States Patent
Chari et al.

(10) Patent No.: US 11,537,448 B1
(45) Date of Patent: Dec. 27, 2022

(54) ADAPTING APPLICATION PROGRAMMING INTERFACES WITH SCHEMA MAPPINGS

(71) Applicant: ASAPP, INC., New York, NY (US)

(72) Inventors: Guido Martín Chari, Buenos Aires (AR); Nicolás Roque D'Ippolito, Ciudad Autónoma de Buenos Aires (AR); Satchuthananthavale Rasiah Kuhan Branavan, London (GB)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 17/551,106

(22) Filed: Dec. 14, 2021

(51) Int. Cl.
  *G06F 3/00* (2006.01)
  *G06F 9/54* (2006.01)
(52) U.S. Cl.
  CPC ...................... *G06F 9/54* (2013.01)
(58) Field of Classification Search
  CPC ........................................................ G06F 9/54
  USPC ......................................................... 719/318
  See application file for complete search history.

(56) References Cited

U.S. PATENT DOCUMENTS

| | | | |
|---|---|---|---|
| 6,389,376 B1 | 5/2002 | Lam et al. | |
| 8,108,223 B2 | 1/2012 | Willoughby | |
| 8,209,238 B2 | 6/2012 | Hughes | |
| 8,271,998 B2 | 9/2012 | Dettori et al. | |
| 8,463,633 B2 | 6/2013 | Jung et al. | |
| 9,092,568 B2 * | 7/2015 | Rhee | G06F 11/3604 |
| 9,804,886 B1 * | 10/2017 | Wells | G06F 9/5033 |
| 10,417,058 B1 * | 9/2019 | Kesler | G06F 9/448 |
| 10,430,318 B1 * | 10/2019 | Ansari | G06F 11/3676 |
| 10,521,738 B2 | 12/2019 | Simó et al. | |
| 10,635,789 B1 | 4/2020 | Golden et al. | |
| 11,262,986 B2 | 3/2022 | Narangodage et al. | |
| 2004/0122690 A1 | 6/2004 | Willoughby | |

(Continued)

FOREIGN PATENT DOCUMENTS

| | | | | |
|---|---|---|---|---|
| CA | 3025479 C | * | 1/2021 | ............ G06F 9/465 |
| CN | 105224305 A | * | 1/2016 | |

(Continued)

OTHER PUBLICATIONS

Mary Jean Harrold, Regression Test Selection for Java Software. (Year: 2001).*

(Continued)

*Primary Examiner* — Lechi Truong
(74) *Attorney, Agent, or Firm* — GTC Law Group PC & Affiliates

(57) ABSTRACT

A first application programming interface (API) with a first schema may be adapted to work with a second API with a second schema using mappings of schema properties and a directed graph. An API call specification of the first API may receive first API schema properties as input and provide first API schema properties as outputs. The first API schema properties may be mapped to corresponding second API schema properties, such as using semantic representations of the schema properties. An implementation of an API call for the first API may be created by using the schema mappings and selecting a path from a directed graph corresponding to the second API, where the path includes a node corresponding to an API call of the second API. Computer code may be generated using nodes of the path, and the computer code may be stored for later use.

18 Claims, 10 Drawing Sheets

(56) References Cited

U.S. PATENT DOCUMENTS

| | | | |
|---|---|---|---|
| 2008/0021988 A1* | 1/2008 | Abernethy | H04L 67/1012 709/224 |
| 2008/0271008 A1 | 10/2008 | Dettori et al. | |
| 2010/0058262 A1 | 3/2010 | Morizawa et al. | |
| 2010/0262471 A1 | 10/2010 | Hughes | |
| 2011/0099159 A1* | 4/2011 | Trevor | G06F 16/958 707/E17.108 |
| 2013/0030859 A1 | 1/2013 | Jung et al. | |
| 2014/0150115 A1 | 5/2014 | Ciudad et al. | |
| 2016/0300060 A1* | 10/2016 | Pike | G06F 21/566 |
| 2017/0351401 A1 | 12/2017 | Pascale et al. | |
| 2018/0039570 A1* | 2/2018 | Rajagopalan | G06F 11/3676 |
| 2018/0152506 A1 | 5/2018 | Simó et al. | |
| 2018/0288190 A1* | 10/2018 | Lyons | G06F 11/3466 |
| 2019/0107410 A1 | 4/2019 | Chakraborty et al. | |
| 2020/0409670 A1 | 12/2020 | Narangodage et al. | |

FOREIGN PATENT DOCUMENTS

| | | | | |
|---|---|---|---|---|
| JP | H11212798 A | * | 8/1999 | |
| JP | 2008211595 A | * | 9/2008 | |
| WO | WO-2020202433 A1 | * | 10/2020 | G06F 3/14 |

OTHER PUBLICATIONS

Behi, Farahzad et al., "Software Development with Automatic Code Generation: Observations from Novice Developer Viewpoint", Proceedings of the International Conference on Software Engineering Research and Practice & Conference on Programming Languages and Compilers, SERP 2006, Las Vegas, Nevada, USA, vol. 1, Jun. 26-29, 2006, 8 pages.

Ed-Douibi, Hamza, et al., "APIComposer: Data-driven Composition of REST APIs", Service-Oriented and Cloud Computing. ESOCC 2018. Lecture Notes in Computer Science, Kritikos K., Plebani P., de Paoli F. (eds), vol. 11116. Springer, Cham, 2018, pp. 161-169.

Lappas, Theodoros, et al., "Finding a Team of Experts in Social Networks", KDD '09: Proceedings of the 15th ACM SIGKDD international conference on Knowledge discovery and data mining, Jun. 2009, pp. 467-476.

Rosales-Morales, Viviana Yarel, et al., "An analysis of tools for automatic software development and automatic code generation", Revista Facultad de Ingenieria, Universidad de Antioquia, No. 77,2015 (accessed on Jan. 3, 2017), pp. 75-87.

Serrano, Diego, et al., "Linked REST APIs: A Middleware for Semantic Rest API Integration", IEEE 24th International Conference on Web Services, 2017, pp. 138-145.

* cited by examiner

ADAPTING APPLICATION PROGRAMMING INTERFACES WITH SCHEMA MAPPINGS

BACKGROUND

An application programming interface (API) allows computers to interact with each other. An API may be documented or defined to communicate the details of how an API may be used. For example, an API may be documented using a document that describes the API schema.

In some instances, a company may use an external API provided by another company. The company may need to use the external API in conjunction with its own internal API. Considerable effort may be required to integrate the external API with the company's internal API.

SUMMARY

In some aspects, the techniques described herein relate to a computer-implemented method, including: obtaining a directed graph corresponding to an external API; selecting a first internal API call specification for a first internal API call of an internal API, wherein the first internal API call specification includes: receiving a first value corresponding to a first internal schema property as input, and providing a second value corresponding to a second internal schema property as output; creating a first internal API call implementation by: mapping the first internal schema property to a first external schema property, mapping the second internal schema property to a second external schema property, selecting a path from the directed graph for implementing the first internal API call, wherein a node on the path corresponds to a first external API call of the external API, and generating computer code corresponding to actions of nodes of the path, wherein the computer code performs the first external API call of the external API; and storing the computer code.

In some aspects, the techniques described herein relate to a computer-implemented method, wherein a starting node of the path corresponds to the first internal schema property and an ending node of the path corresponds to the second internal schema property.

In some aspects, the techniques described herein relate to a computer-implemented method, wherein a starting node of the path corresponds to the first external schema property and an ending node of the path corresponds to the second external schema property.

In some aspects, the techniques described herein relate to a computer-implemented method, wherein: a second node on the path corresponds to a second external API call; and the computer code performs the second external API call.

In some aspects, the techniques described herein relate to a computer-implemented method, wherein selecting the path includes computing a cost for the path.

In some aspects, the techniques described herein relate to a computer-implemented method, the cost is computed using a number of external API calls on the path.

In some aspects, the techniques described herein relate to a computer-implemented method, wherein the computer code corresponds to an abstract syntax tree.

In some aspects, the techniques described herein relate to a computer-implemented method, wherein the computer code is specified using functional programming.

In some aspects, the techniques described herein relate to a system, including at least one computing device including at least one processor and at least one memory, the at least one computing device configured to: obtain a directed graph corresponding to an external API; select a first internal API call specification for a first internal API call of an internal API, wherein the first internal API call specification includes: receiving a first value corresponding to a first internal schema property as input, and providing a second value corresponding to a second internal schema property as output; create a first internal API call implementation by: mapping the first internal schema property to a first external schema property, mapping the second internal schema property to a second external schema property, selecting a path from the directed graph for implementing the first internal API call, wherein a node on the path corresponds to a first external API call of the external API, and generating computer code corresponding to actions of nodes of the path, wherein the computer code performs the first external API call of the external API; and store the computer code.

In some aspects, the techniques described herein relate to a system, wherein the at least one computing device is configured to: obtain a second directed graph corresponding to a second external API; create a second internal API call implementation by: mapping the first internal schema property to a third external schema property of the second external API, mapping the second internal schema property to a fourth external schema property of the second external API, selecting a second path from the second directed graph where in a second node on the second path corresponds to a second external API call of the second external API, and generating second computer code corresponding to second actions of second nodes of the second path, wherein the second actions include performing the second external API call of the second external API; and store the second computer code.

In some aspects, the techniques described herein relate to a system, wherein the at least one computing device is configured to: select a second internal API call specification for a second internal API call, wherein the second internal API call specification includes: receiving a third value corresponding to a third internal schema property as input, and providing a fourth value corresponding to a fourth internal schema property as output; create a second internal API call implementation by: mapping the third internal schema property to a third external schema property, mapping the fourth internal schema property to a fourth external schema property, selecting a second path from the directed graph where in a second node on the second path corresponds to a second external API call of the external API, and generating second computer code corresponding to second actions of second nodes of the second path, wherein the second actions include performing the second external API call of the external API; and store the second computer code.

In some aspects, the techniques described herein relate to a system, wherein: the internal API is an API of a provider company; and the external API is an API of a company that is a customer of the provider company.

In some aspects, the techniques described herein relate to a system, wherein the computer code includes structured text.

In some aspects, the techniques described herein relate to a system, wherein the at least one computing device is configured to use the computer code to implement the first internal API call in production.

In some aspects, the techniques described herein relate to a system, wherein the at least one computing device is configured to determine a mapping from the first internal schema property to a first external schema property using a first internal semantic representation of the first internal schema property and a first external semantic representation of the first external schema property.

In some aspects, the techniques described herein relate to a system, wherein the at least one computing device is configured to: receive a specification for the external API; and generate the directed graph using the specification.

In some aspects, the techniques described herein relate to one or more non-transitory, computer-readable media including computer-executable instructions that, when executed, cause at least one processor to perform actions including: obtaining a directed graph corresponding to an external API; selecting a first internal API call specification for a first internal API call of an internal API, wherein the first internal API call specification includes: receiving a first value corresponding to a first internal schema property as input, and providing a second value corresponding to a second internal schema property as output; creating a first internal API call implementation by: mapping the first internal schema property to a first external schema property, mapping the second internal schema property to a second external schema property, selecting a path from the directed graph for implementing the first internal API call, wherein a node on the path corresponds to a first external API call of the external API, and generating computer code corresponding to actions of nodes of the path, wherein the computer code performs the first external API call of the external API; and storing the computer code.

In some aspects, the techniques described herein relate to one or more non-transitory, computer-readable media, wherein: the first internal API call specification includes receiving a third value corresponding to a third internal schema property as input; and creating a first internal API call implementation includes mapping the third internal schema property to a third external schema property.

In some aspects, the techniques described herein relate to one or more non-transitory, computer-readable media, wherein: the first internal API call specification includes providing a third value corresponding to a third internal schema property as output; and creating the first internal API call implementation includes mapping the third internal schema property to a third external schema property.

In some aspects, the techniques described herein relate to one or more non-transitory, computer-readable media, wherein the actions include: selecting a first domain corresponding to the external API from a plurality of domains; wherein the first internal API call specification is associated with the first domain.

BRIEF DESCRIPTION OF THE FIGURES

The invention and the following detailed description of certain embodiments thereof may be understood by reference to the following figures.

DETAILED DESCRIPTION

Figure 1:
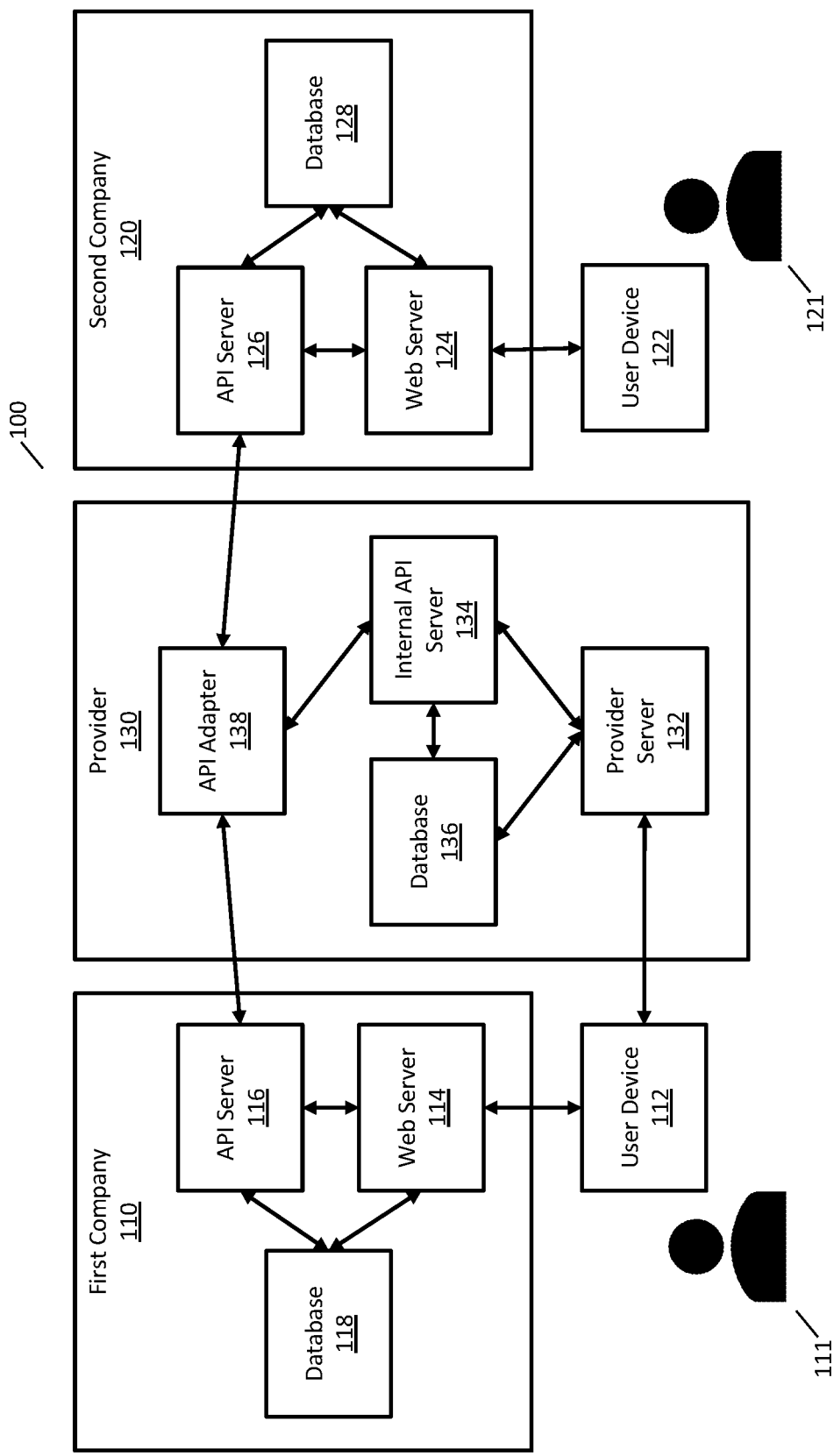
FIG. 1 is an example system whereby a provider may provide services to companies by integrating the APIs of the companies.

A provider entity or provider company (referred to herein as a provider) may provide services to other companies (other entities that are customers of the provider entity) where the services use application programming interfaces (APIs) of the companies. As used herein, an API includes any techniques for allowing the transfer of data between computers or computer programs. The provider may use the API of a company, for example, to obtain data of the company for providing the services or to update data of the company. The provider may also have its own internal APIs to provide services to the companies. The provider's internal API may thus use the external APIs of the customers. The provider may provide any appropriate services, such as services relating to customer support.

An API may be organized using entities and properties, and each API may have its own definitions of entities and properties. For example, an API may have a user entity to store information about users, and each user entity may have properties to store information about the users. A user entity may have properties such as a first name, last name, phone number, and so forth. In some instances, entities may be nested. For example, a user entity may have multiple address entities (e.g., a home address and a work address) and each address entity may have a street property, a city property, a state property, and so forth.

An API may define operations that may be performed on entities. In some implementations, the API may be a REST API (representational state transfer API) with operations that may correspond to the common HTTP (hypertext transfer protocol) operations, such as GET, POST, PUT, PATCH, and DELETE. For example, a GET operation on an entity may retrieve the entity's properties, a POST operation may create a new entity, and a DELETE operation may delete an entity.

An API may be documented using any appropriate techniques. In some instances, an API may be documented by publishing a schema for the API. The schema may provide information about the entities, the properties of the entities, and how to perform operations on the entities.

One difficulty in using APIs created by different entities is that the naming and organization of the schemas may be different. For example, a first API may have a customer entity with a first_name property. A second API may instead have a user entity with a first property. As the number of APIs increases, coordinating among the different naming conventions and organizations of the API schemas becomes even more complicated.

The provider, described above, may have its own internal API with an internal API schema. When the provider starts working with a first company, the provider may be need to integrate the first external API schema of the first company to be able to use the first external API with its internal API. The integration may include learning how to map between the entities, properties, and operations of its internal API and the first external API. When the provider starts working with a second company, the same process may need to be repeated for a second external API, and so forth.

The techniques described herein reduce the burden of integrating one or more APIs by automating aspects of the integration process. The techniques described herein may use any of the techniques described in U.S. patent application publication US20200409670A1, which is hereby incorporated by reference.

FIG. 1 is an example system 100 whereby a provider may provide services to companies by integrating the APIs of the companies.

In FIG. 1, provider 130 is a company that provides services to first company 110 and second company 120. For clarity of presentation, FIG. 1 shows provider providing services to two companies, but provider may provide services to any number of companies. Provider 130 may provide any appropriate services to first company 110 and second company 120, such as services relating to customer support.

User 111 may be a customer of first company 110 and may use user device 112 to interact with first company 110. User device 112 may be any device that a user may use to interact with a company, including but not limited to a conventional telephone, a computer, a smart phone, or any other mobile device. For example, user 111 may call first company 110 to place an order or may use the website of first company 110.

First company 110 may have any appropriate infrastructure for providing services to its customers, such as user 111. For example, the infrastructure of first company 110 may include the following: a web server 114 for presenting web pages and similar content to users; an API server 116 that provides APIs for use internally and by third parties; and a database 118 that may store information for providing services to users, such as contact information of users.

In a similar manner, second company 120, may have a user 121 who may use user device 122 to interact with second company 120. Second company 120 may also have any appropriate infrastructure for providing services to its customers, such as user 121. For example, the infrastructure of second company 120 may include web server 124, API server 126, and database 128.

Provider 130 may provide services to first company 110, second company 120, and other companies such that provider 130 uses the external APIs of the companies in providing the services. For clarity of presentation, the following description will use first company 110 as an example of a company receiving services from provider 130, but the same techniques may be used for other companies as well.

Provider 130 may provide services to different types of people associated with first company 110. For example, provider 130 may provide services to user 111 (e.g., a customer of first company 110) who is using user device 112 to perform actions relating to first company 110 (e.g., obtain customer support or purchase a product). For another example, provider 130 may provide services to a customer service representative who uses a customer service representative device to provide customer service to user 111. For another example, other employees of first company 110 may use devices to perform a variety of actions relating to the business of first company 110 (e.g., accounting, sales, marketing, etc.). For clarity of presentation, the following description will use user 111 as an example of a person being assisted by the services of provider 130, but the same techniques may be used to assist a variety of other people associated with first company 110.

One example of a service provided by provider 130 may be text chat or text-based customer support on the website of first company 110. User 111 may use user device 112 to navigate to a website that is served by web server 114. The web page served to user device 112 may include an app or widget that allows user 111 to send text messages. This app or widget may be provided by provider 130 and served by provider server 132. For example, the served web page may include an iframe that retrieves the content of the iframe from provider server 132. User 111 may then use the app or widget to send text messages and the text messages may be sent to provider server 132.

Other architectures for an app or widget in a web page are also possible. For example, provider 130 may provide the content of the app or widget to servers of first company 110, and then first company 110 may provide the web page with the content of the app or widget. With this architecture, user device 112 may not communicate directly with provider server 132 but only indirectly via servers of first company 110. For clarity of presentation, the following description will use the architecture of FIG. 1 as an example, but similar techniques may be applied to other architectures as well.

In the process of providing services, provider 130 may need to perform operations using the first external API of first company 110. For example, user 111 may send a text message asking for the amount of the most recent bill. Provider 130 may not store this information and may need to request it from first company 110. Provider 130 may provide similar services to other companies, such as second company 120, and may need to request the information from servers of second company 120.

To reduce the complexities of using the external APIs of multiple companies, provider 130 may have its own set of internal APIs. For example, provider 130 may have an internal API call to obtain the amount of a user's most recent bill. With the internal API call, processing of provider 130 (such as processing of provider server 132) may use the internal API call and does not need to be aware of the details of the external API calls of the companies. Using such an internal API call may simplify the software of provider 130 and reduce the costs of maintaining and improving the software. Using the internal API may also reduce the costs for provider 130 of integrating the external APIs of additional companies.

Provider 130 may have any appropriate infrastructure for providing services to companies, such as first company 110. For example, the infrastructure of provider 130 may include the following: a provider server 132 that may perform any appropriate operations relating to providing the services, such as presenting the contents of an app or widget on a web page of first company 110; an internal API server 134 for processing internal API calls; a database 136 that may store any appropriate information relating to providing services; and an API adapter 138 that may be used to adapt internal API calls to external API calls of first company 110 or other companies.

The infrastructure of provider 130 may provide services to user 111 where the services use the first external API of first company 110. For example, provider server 132 may implement a text chat with user 111, and in processing a text message, it may be determined that the user is requesting to see that amount of the most recent invoice. Provider server 132 may use an internal API call to obtain the amount of the most recent invoice. The internal API call may be processed by internal API server 134, which uses adapter 138 to adapt the internal API call to actions that include an external API call of first company 110. The external API call is processed by API server 116 of first company 110, which may retrieve information from database 118 of first company 110. When the external API is complete, the information may be returned to the internal API call. This allows the internal API call to complete and return the information to provider server 132. This allows provider server 132 to provide the information to user 111.

One aspect of adapting an internal API call to an external API call of a company is mapping the internal API schema to the external API schema. As described above, different API schemas may have different organizations of entities, properties, and operations. A person may manually map one API schema to another, but the process may be time consuming and error prone. Automated techniques, as described herein, may reduce costs and errors in mapping one API schema to another.

Figure 2:
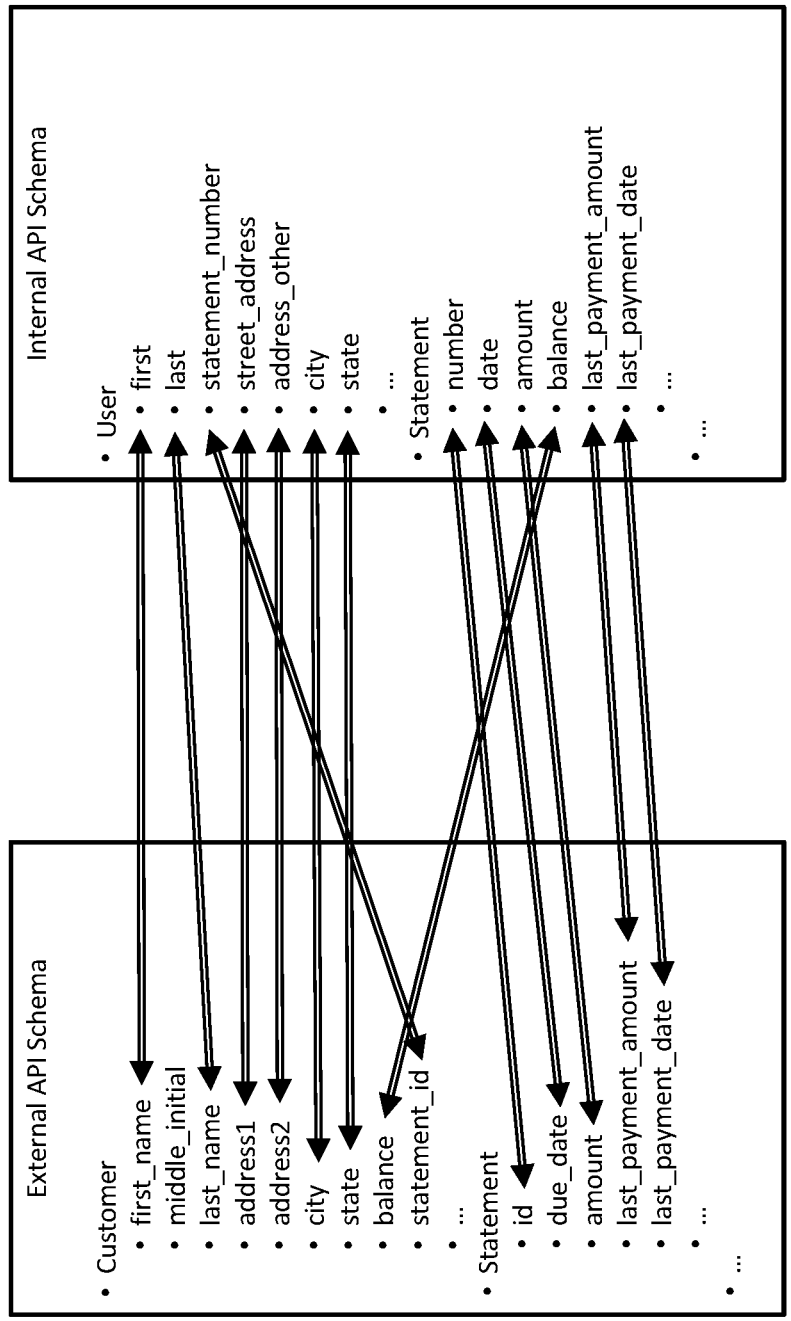
FIG. 2 is example mapping between an internal API schema and an external API schema.

FIG. 2 is an example mapping between an internal API schema and an external API schema. For describing the relationships between the schemas, it is helpful to define some terminology. The "real entity" refers to the actual person or thing represented by the entity. The "schema entity" refers to the representation of the real entity in the schema.

For example, a real entity may be the customers of first company 110, such as user 111. Depending on perspective, user 111 may be referred to as a customer of first company 110 or an end user of first company 110. When first company 110 creates its external API schema, it may choose an external schema entity with the external name of Customer. When provider 130 creates the internal API schema, it may choose an internal schema entity with the internal name of User (because user 111 is not a customer of provider 130). The same real entity has different names in the two API schemas. Accordingly, in some instances, two schemas may use the same schema entity name for the same real entity (e.g., the Statement entity in FIG. 2), but in some instances, two schemas may use different schema entity names for the same real entity (e.g., the User and Customer entities in FIG. 2).

Similarly, a "real property" may represent a type of value corresponding to a real entity. For example, the real entity for customers of first company 110 may have a real property of a first name. When first company 110 creates its external API schema, it may choose an external schema property with the external name of first_name. When provider 130 creates its internal API schema, it may choose an internal schema property with the internal name of first. Accordingly, in some instances, two schemas may use the same schema property name for the same real property (e.g., the city property in FIG. 2), but in some instances, two schemas may use different schema property names for the same real property (e.g., the first_name and first properties in FIG. 2).

Further, in some instances, different API schemas may have different organizations of real properties and real entities. The current balance of a customer of first company 110 may be a real property. In FIG. 2, the current balance real property is stored by first company 110 in an external schema property balance that is part of the external schema entity Customer. The same real property is stored by provider 130 in an internal schema property balance that is part of an internal schema entity Statement.

Further, in some instances, there may not be a one-to-one correspondence between properties of two schemas. For example, a second external API schema for second company 120 may have an external schema property for the full name of the customer. By contrast, the internal API schema has a first name schema property and a last name schema property. There is thus not a one-to-one mapping between these schema properties. In some instances, the mapping may be one-to-many or many-to-one and include computations, such as splitting a full name into a first name and a last name or concatenating a first name and a last name into a full name.

In some instances, correspondences that are not one-to-one may include performing computations. For example, a first schema may have a first schema property for an amount due and a second schema property for an amount received. A second schema may have a schema property for the account balance. The account balance may be calculated by subtracting the amount received from the amount that is due.

Semantic processing may be used to facilitate mapping between APIs. Although the entity and property names used may differ between APIs, it may be the case that the names used have a similar meaning. For example, in the example of FIG. 2, the external API has a Customer entity and the internal API has a User entity. Although the names are different, they have similar meanings in that customer of a company is often a user of the company's products and a user of a company's products is often a customer. These similar meanings may be used to assist in mapping between APIs.

The meanings of words, phrases, sentences, and so forth may be represented numerically. Where meanings are represented numerically, two words may have similar meanings when their numerical representations are close to each other. By contrast, two words may have different meanings when their numerical representations are far from each other. In some implementations, the meaning of text (e.g., a word, phrase, or sentence) may be represented as a vector in a vector space. The numerical representation of the meaning of text may be referred to as a semantic representation.

Any appropriate semantic representations may be used. The type of semantic representation may depend on the amount of text being processed. For example, for representing the meanings of individual words (or possibly tokens or phrases), a semantic representation may be computed using techniques, such as word embeddings, GloVe, and word2vec. For representing the meaning of sentences, the semantic representation may be computed by processing the sentence with a neural network, such as a recurrent neural network (e.g., with long short-term memory) or a transformer neural network (e.g., a bidirectional encoder representations from transformers (BERT) neural network).

In some implementations, a semantic representation of a schema entity may be computed from the name of the entity in the schema (e.g., Customer or User). In some implementations, other information may be available such as a description of the entity in the documentation for the API. A semantic representation may be computed from the entity description. In some implementations, a semantic representation of an entity in a schema may be computed from multiple sources. For example, the semantic representation may be computed as the average or concatenation of the semantic representations of the entity name and the entity description.

Similarly, a semantic representation of a schema property may be computed from a semantic representation of the property name, a semantic representation of a description of the property, or a combination thereof (e.g., average or concatenation). In some implementations, other information may be used to compute a semantic representation of a property, such as a semantic representation of the entity to which the property belongs, semantic representations of other properties in the same entity, or semantic representations of values of the property (e.g., actual last names for a last_name property). For example, a semantic representation of a schema property may be computed as the concatenation of the following: a semantic representation of a property description, a semantic representation of the property name, and a semantic representation of the entity to which the property belongs.

Accordingly, a semantic representation may be computed for schema properties of a first API, semantic representations may be computed for schema properties of a second API, and the semantic representations may be used to map properties between the two APIs.

Figure 3:
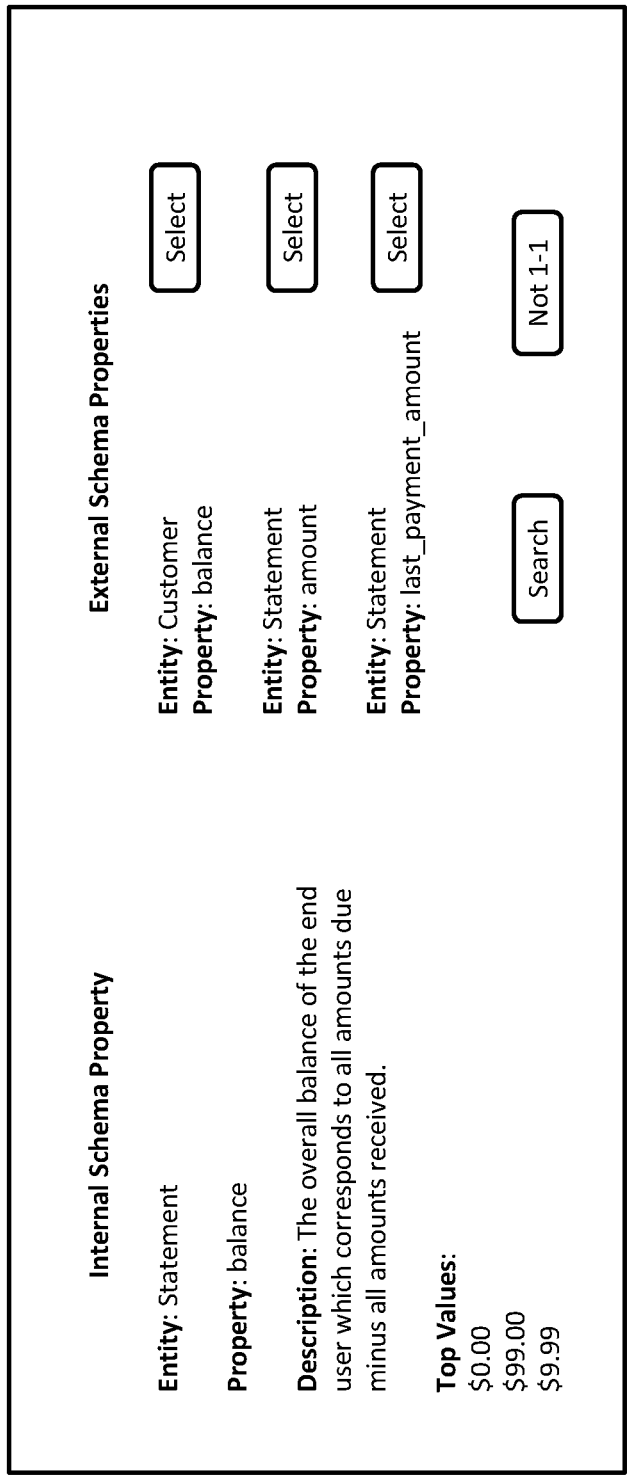
FIG. 3 is an example user interface where semantic representations are used to assist a person in mapping schema properties.

In some implementations, the semantic representations may be used to assist a person mapping schema properties between a first API and a second API. FIG. 3 is an example user interface where semantic representations are used to assist a person in mapping schema properties.

In FIG. 3, it is desired to map an internal schema property to an external schema property (or it could be performed in the opposite direction). In FIG. 3, information about a first internal schema property is presented on the left. Any appropriate information may be presented to help the person understand the first internal schema property, such as the name of the entity to which it belongs, the name of the property, a description of the property, and example values for the property (e.g., the top or most common values).

A semantic representation may be computed for the first internal schema property using any of the techniques described herein. Similarly, semantic representations may be computed for external schema properties of the external API. Distances may be computed between the semantic representation of the first internal schema property and the semantic representations of the external schema properties. These distances may be used to identify one or more external schema properties whose semantic representations are closest (e.g., according to a distance, such as Euclidean distance) to the semantic representation of the first internal schema property.

Any appropriate techniques may be used to select the one or more external schema properties. For example, a fixed number (e.g., three) of closest external schema properties may be selected or all external scheme properties within a threshold distance may be selected.

Information about the selected external schema properties may be presented to the person, such as shown on the right in FIG. 3. Any appropriate information may be presented to help the person understand the external schema properties, such as the name of the entity to which it belongs, the name of the property, a description of the property, example values for the property (e.g., the top or most common values), and a distance to the first internal schema property.

Any appropriate user interface controls may be presented to the person to allow the person to select an external schema property to be mapped to the first internal schema property. For example, as shown in FIG. 3, a "Select" button may be located next to each of the external schema properties. Further, other user interface controls may be used where the person decides that none of the external schema properties are a good match for the first internal schema property. For example, a "Search" button may provide an option to allow the person to manually search for other external schema properties or a "Not 1-1" may allow the person to indicate that a one-to-one mapping is not possible for the first internal schema property.

The user interface may similarly be used to find mappings for other internal schema properties.

In some instances, the mapping from internal schema properties to external schema properties may be performed automatically without the assistance of a person. Any appropriate rules may be used for determining when a mapping may be performed without requesting confirmation from a person. For example, a rule may correspond to the following: an internal schema property may be automatically mapped where (1) exactly one external schema property has a distance to the semantic representation of the internal schema property that is less than a first threshold, and (2) for all other external schema properties, the distance to the semantic representation of the internal schema property is larger than a second threshold. Where this rule is satisfied, the internal schema property may be mapped to an external schema property without requesting confirmation from a person.

In some implementations, the selection of candidate external schema properties for internal schema properties may be performed using global optimization instead of considering each internal schema property individually. For example, where an external schema property is very close to an internal schema property, it may be less likely that the external schema property is selected as a candidate for other internal schema vectors. Any appropriate global optimization techniques may be used, such as simulated annealing.

Figure 4:
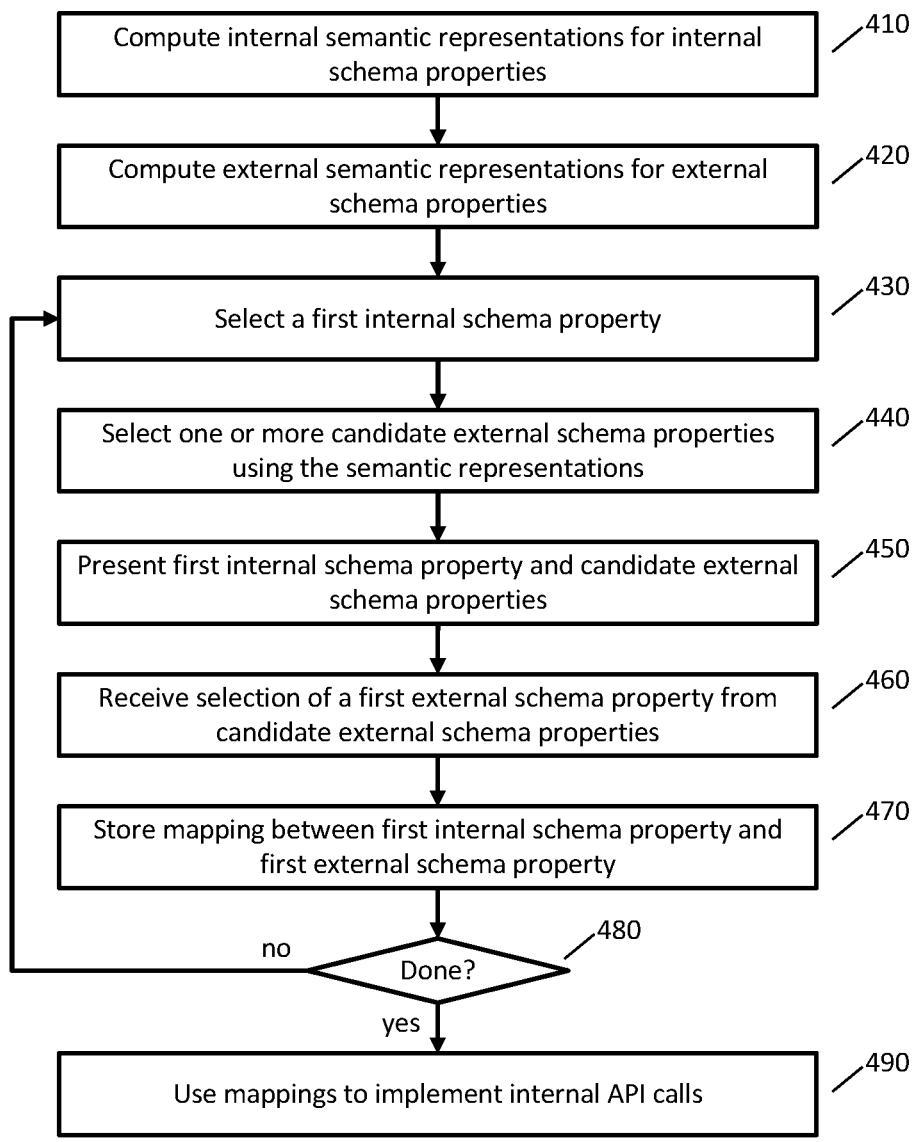
FIG. 4 is a flowchart of an example method for mapping schema properties between an internal API and an external API.

FIG. 4 is a flowchart of an example method for mapping schema properties between an internal API and an external API. As used herein an internal API and an external API may refer to any two APIs where it is desired to map schema properties from one API to the other API. The two APIs need not be external or internal to any company or entity.

At step 410, internal semantic representations (e.g., internal semantic vectors) are computed for internal schema properties of an internal API. The internal semantic representations may be computed using any of the techniques described herein. In some implementations, the internal semantic representations may be computed in advance and stored. Accordingly, when performing the operations of FIG. 4, the internal semantic representations may be retrieved from storage and may not need to be computed.

At step 420, external semantic representations (e.g., external semantic vectors) are computed for external schema properties of an external API. The external semantic representations may be computed using any of the techniques described herein. The external semantic representations may also be computed in advance and retrieved from storage.

At steps 430 to 470, the processing iterates over internal schema properties. A first internal schema property is selected for processing to map the first internal schema property to a first external schema property. Steps 430 to 470 may be repeated for one or more other internal schema properties. In some implementations, steps 430 to 470 may instead iterate over external schema properties to map them to internal schema properties. In some iterations, global optimization may be used to simultaneously map between internal and external schema properties.

At step 430, a first internal schema property is selected. Any appropriate internal schema property may be selected using any appropriate techniques. For example, the first internal schema property may be selected in an iteration of a loop over the internal schema properties.

At step 440, one or more candidate external schema properties are selected by comparing a first internal semantic representation for the first internal schema property to the external semantic representations. The one or more candidate external schema properties may be selected using any appropriate techniques, such as any of the techniques described herein. In some implementations, a distance may be computed between the first internal semantic representation and each of the external semantic representations. In some implementations, hierarchical clustering techniques may be used to reduce computations. The one or more candidate external schema properties may include a first external schema property.

At step 450, the first internal schema property and the one or more candidate external schema properties are presented to a person. Any appropriate information may be presented to the person, such as any of the information described in FIG. 3. The schema properties may be presented using any appropriate user interface, such as a web page or a custom built computer application.

At step 460, a selection of the first external schema property is received from the person. The selection may be received using any appropriate techniques. For example, the person may click on a button to cause a computer to transmit information (e.g., using an HTTP POST) and the information may be received by a server computer.

In some instances, steps 450 and 460 may be skipped. For example, where the semantic representations indicate with high confidence that the first internal schema property corresponds to the first external schema property, it may not be needed to request confirmation from a person. In some instances, other information may be received such as a request to search for other external schema properties or an indication that a one-to-one mapping is not possible for the first internal schema property.

At step 470, the mapping between the first internal schema property and the first external schema property is stored for later use.

At step 480, it is determined whether additional internal schema properties remain to be processed. If additional internal schema properties remain to be processed, then processing proceeds to step 430 where another internal schema property is selected. If no internal schema properties remain to be processed then processing proceeds to step 490.

At step 490, the mappings between the internal schema properties and the external schema properties may be used to implement internal API calls as described herein.

In some implementations, provider 130 may have a hierarchy of internal API schemas. For example, provider 130 may have customers (such as first company 110 and second company 120) whose businesses correspond to different domains or industries. For example, first company 110 may be an airline, and second company 120 may be a telecom company.

Provider 130 may provide different services to companies in different domains where some services require certain entities and some services do not. For example, provider 130 may have a user schema entity that is used with all of the companies it provides services to because all of these companies may have end users or customers. Provider 130 may have a city schema entity that is used with airline companies for departure and arrival cities of flights. Provider 130 may not, however, use the city schema entity with telecom companies because they have no need for departure and arrival cities.

In a similar manner, even where all companies may use a particular schema entity, the companies may differ as to the needed schema properties. For example, the airline companies may need a schema property in the user entity for a frequent flyer number and the telecom companies may not need this schema property.

Figure 5:
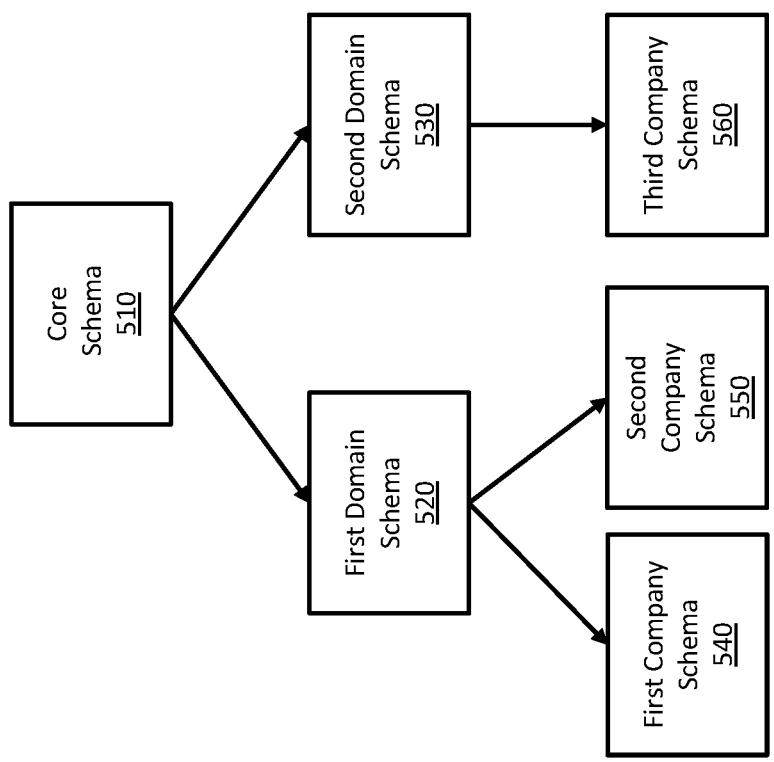
FIG. 5 is an example of a hierarchical API schema.

To improve the accuracy and maintainability of mapping between an internal API schema and multiple external API schemas, a hierarchy of internal API schemas may be used. FIG. 5 is an example of a hierarchical API schema.

In FIG. 5, core schema 510 includes schema entities and properties used by a provider with all (or most) companies it provides services to. A provider may serve companies in multiple domains and may accordingly augment the core schema 510 in different ways for the different domains. First domain schema 520 may add schema entities and properties for a first domain (e.g., airlines), and second domain schema 530 may add schema entities and properties for a second domain (e.g., telecom companies).

In some instances, a provider may need to add additional schema entities or properties for a specific company. For example, a first airline may have schema entities and properties that are not widely used with other airlines (e.g., a schema entity for pets or a schema property for meal preferences). Accordingly, a provider may augment the schema hierarchy with additions for specific customers. In FIG. 5, first company schema 540 and second company schema 550 are schema additions for two companies in the first domain and they thus add to first domain schema 520. Similarly, third company schema 560 includes schema additions for a third company in the second domain, and third company schema 560 thus depends from second domain schema 530.

Before performing the processing of FIG. 4, an internal API schema may be selected or created corresponding to the domain of the company. For example, where the company is a telecom company, an internal API schema for telecom companies may be selected. By selecting a schema corresponding to the matching domain, the schema entities and properties specific to other domains (e.g., airlines) have already been excluded. Accordingly, when mapping internal schema properties to external schema properties the work is reduced because only relevant internal schema properties are considered.

A hierarchy of internal schemas has numerous benefits for providers, such as provider 130. The hierarchy reduces the burdens of maintain internal APIs that are common to many or all companies. For example, an internal API call to retrieve a user profile may be needed for all companies. Accordingly, a single internal API call for retrieving a user profile may be maintained as part of a core schema and used for all companies. Without a hierarchical API schema, it may be needed to maintain an internal API call for each domain or even for each company.

The hierarchy of internal schemas reduces the burdens of mapping an internal API to an external API. If a provider has a single schema, it may need to process the entire schema for each company even if large portions of the schema are not needed for specific domains or customers. By selecting the appropriate internal API schema from a hierarchy, the mapping of APIs may be focused on the schema properties that are actually needed for the company. This may reduce the costs of integrating an external API and also reduce the error rate of mapping schema properties.

Returning to FIG. 1, mapping internal API schema properties to external API schema properties is one aspect of adapting an internal API call to an external API. Other aspects of adapting API calls are now described.

Figure 6:
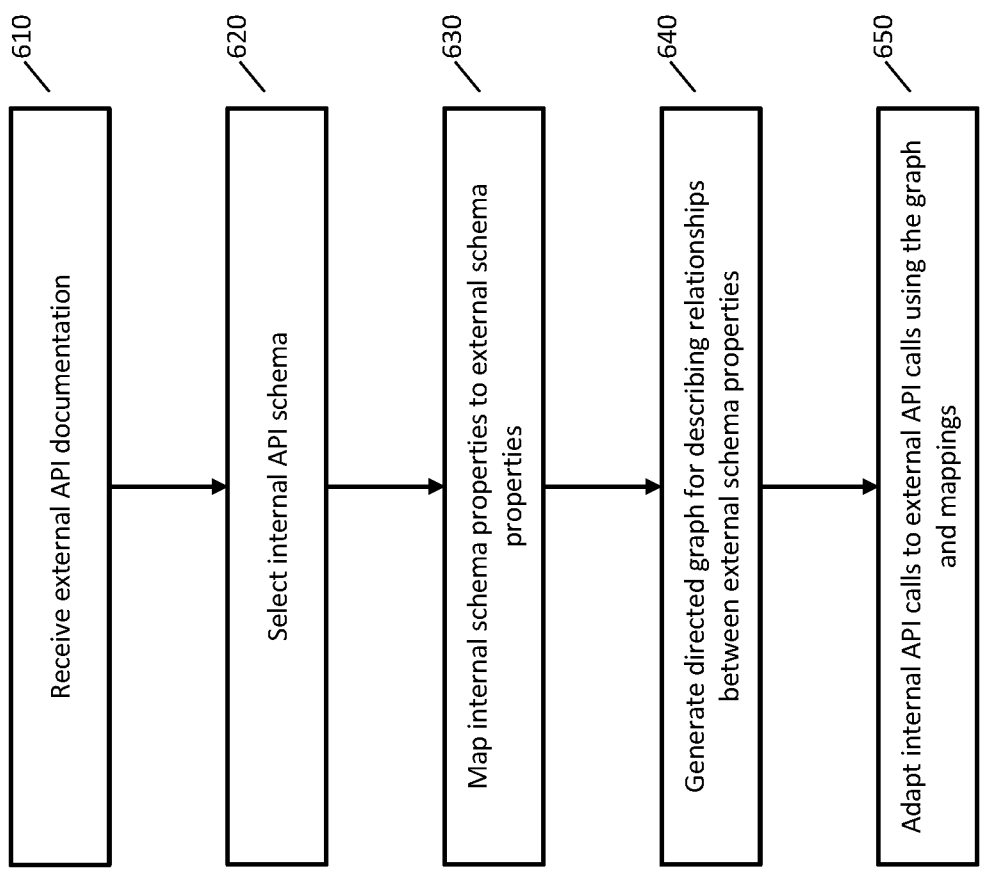
FIG. 6 is a flowchart of an example method for adapting internal API calls to external API calls.

FIG. 6 is a flowchart of an example method for adapting internal API calls to external API calls.

At step 610, a specification or documentation is received for an external API. For example, provider 130 may obtain a new company as a customer, and the customer may provide a specification or documentation of its external API so that it may be used by provider 130. The specification or documentation may be in any appropriate format, such as a representation of the external API schema in JSON or XML format.

At step 620, an internal API schema is selected. For example, an internal API schema may be selected according to the domain of the company. In some instances, a new internal API schema may be created for the customer and the new internal API schema may inherit from another schema, such as a domain schema or a core schema.

At step 630, internal schema properties are mapped to external schema properties. The schema properties may be mapped using any appropriate techniques, such as any of the techniques described herein.

At step 640, a directed graph is generated for describing relationships between external schema properties. The directed graph may be generated using any appropriate techniques, such as any of the techniques described in U.S. patent application publication US20200409670A1, which is incorporated by reference herein. The use and generation of the directed graph is described in greater detail below.

At step 650, internal API calls are adapted to external API calls using the schema mappings and the directed graph. The adaption of internal API calls is described in greater detail below. In some implementations, the adaption of internal API calls may be performed dynamically at run time, such as contemporaneously with an internal API call. In some implementations, the adaptation of internal API calls to external API calls may be performed in advance, and the results of the adaption may be stored and used in production.

Figure 7:
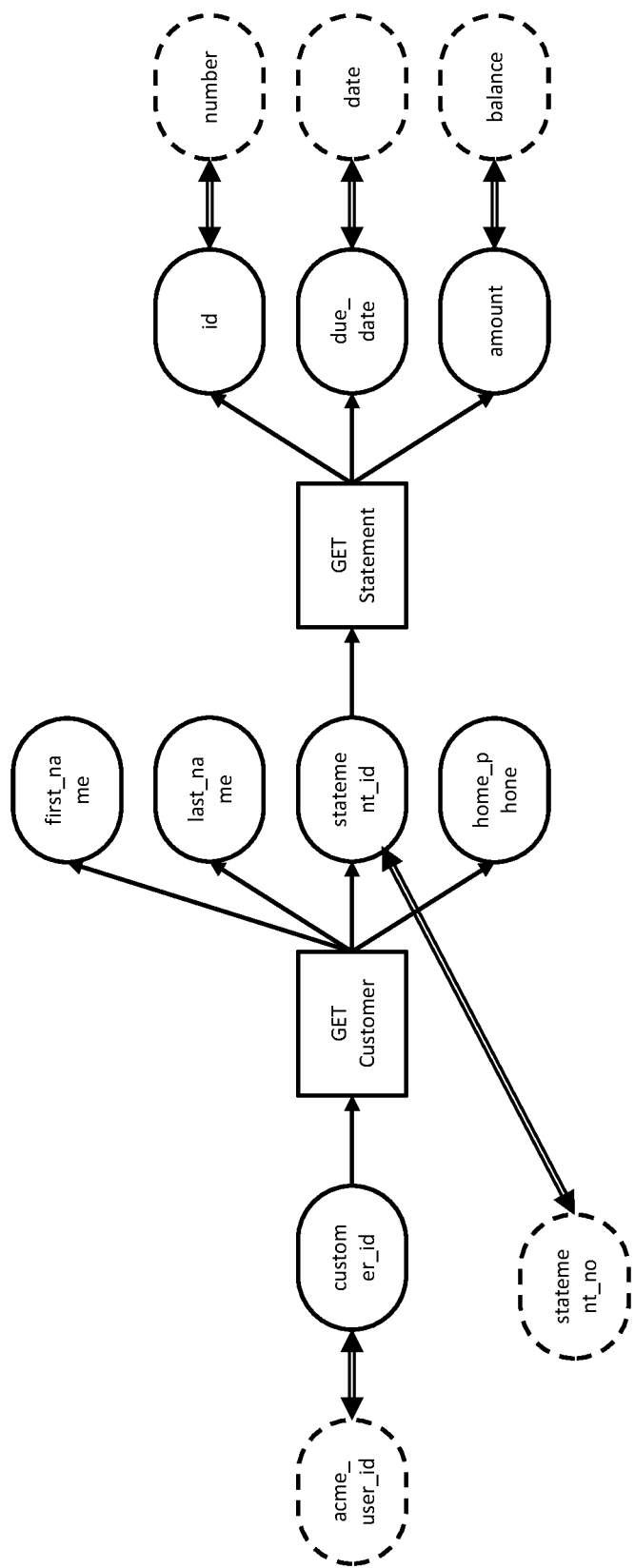
FIG. 7 is an example directed graph that may be used to adapt an internal API call to an external API call.

FIG. 7 is an example directed graph that may be used to adapt an internal API call to an external API call. In FIG. 7, the boxes correspond to external API calls, the solid ovals correspond to external schema properties, and the dashed ovals correspond to internal schema properties.

The directed graph may be generated using the documentation or schema for the external API. The external API includes external API calls, and it also includes external schema properties that are inputs and/or outputs to the external API calls. An external schema property may be an output of a first external API call and an input to a second external API call. For example, the external API may have an API call to retrieve a Customer entity (e.g., a customer profile) that receives a customer_id property as an input and outputs a number of properties corresponding to the customer, such as first_name, last_name, statement_id, and home_phone. The external API may also have an API call to retrieve a Statement entity that receives the statement_id property as an input and outputs a number of properties.

A directed graph may be created by adding nodes for each of the API calls (e.g., the boxes in FIG. 7), adding nodes for each of the schema properties (e.g., the solid ovals in FIG. 7), and then adding directed arrows or edges for the inputs and outputs of each API call.

FIG. 7 illustrates two external API calls and their inputs and outputs. The external API call to get a Customer entity receives a customer_id property as input and outputs several properties relating to a customer, such as a statement_id. The external API call to get a Statement entity receives a statement_id property as input and outputs several properties relating to a statement.

In FIG. 7, the internal schema properties are illustrated as dashed ovals and the mappings between the internal schema properties and the external schema properties are shown by the double arrows. In some implementations, the internal schema properties may be separate nodes in the directed graph, as illustrated in FIG. 7. The mapping between the internal and external properties may be used to add bidirectional arrows between corresponding internal and external property schema nodes. In some implementations, the information about the internal schema property may be stored with the node for the external schema property. For example, the node for the external schema property may store data or metadata indicating the internal schema property that maps to the external schema property.

The directed graph of FIG. 7 may be used to adapt an internal API call to one or more external API calls. The adaptation may be performed dynamically at runtime, or the adaptation may be performed in advance to generate computer code that may be used at a later time. The directed graph is able to represent relationships between schema properties of an API and provides a computationally efficient data structure for determining how to obtain values of schema properties given other schema properties.

Figure 8:
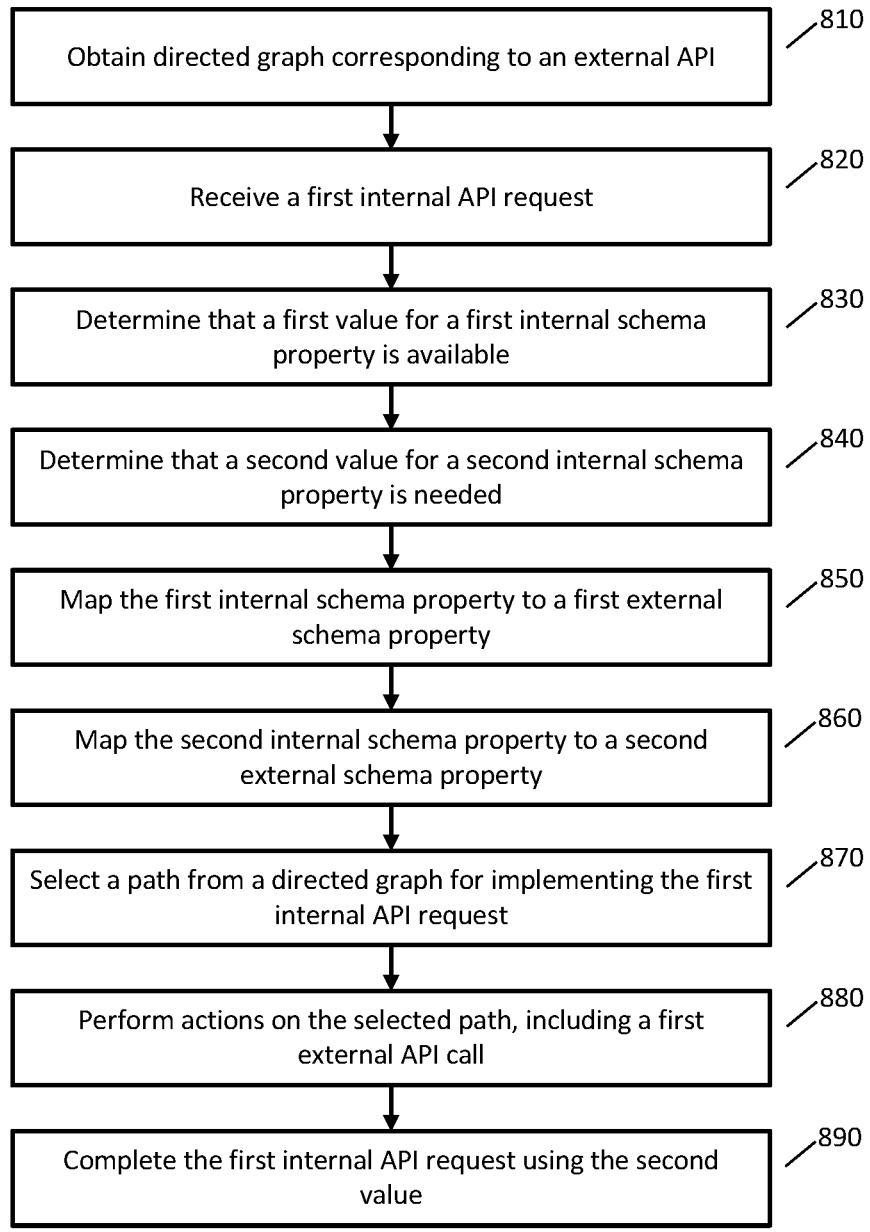
FIG. 8 is a flowchart of an example method for dynamic adaption of internal API calls to external API calls.

FIG. 8 is a flowchart of an example method for dynamic adaption of internal API calls to external API calls. The adaptation may be referred to as dynamic because the adaptation may be performed when needed in a production environment. Although the method below refers to external and internal APIs, the same techniques may be applied to a first API and a second API, and the first and second APIs need not have an external or internal relationship with each other or with respect to any entity. For example, the first and second APIs may both be internal APIs of a company.

At step 810, a directed graph corresponding to an external API is obtained. The directed graph may include nodes corresponding to external API calls and nodes corresponding to internal schema properties and/or external schema properties.

At step 820, a first internal API request is received. The first internal API request may correspond to any appropriate API and may arise from any appropriate circumstances, such any services provided by provider 130 to a company such as first company 110. For example, the first internal API request may be received in response to a user (e.g., user 111) performing an action on a web site or during a text chat, a response to a customer service representative performing an action during a communications session with a user (e.g., a text chat or a phone call), or any of the other examples described herein.

At step 830, it is determined that a first value for a first internal schema property is available to complete the first internal API request. The determination may be performed using any appropriate techniques. For example, it may be determined that the first value is stored in a database, stored in a cache, or has been provided as an input to the first internal API request. It may also be determined that other values for other internal schema properties are also available to complete the first internal API request.

At step 840, it is determined that a second value for a second internal schema property is needed to complete the first internal API request. The determination may be performed using any appropriate techniques. For example, it may be determined that the second value is needed for processing relating to the first internal API request or that the second value is an output of the first internal API request. It may also be determined that other values for other internal schema properties are also needed to complete the first internal API request.

At step 850, the first internal schema property is mapped to a first external schema property. The mapping may be performed using any appropriate techniques. For example, a data structure or function may be used to return an external schema property given an internal schema property. For another example, a first node of the directed graph may be obtained using the first internal schema property (e.g., using an identifier of the internal schema property). The first node may include data or metadata associated with the first external schema property, or the first node may be connected with a second node of the graph, where the second node corresponds to the first external schema property.

At step 860, the second internal schema property is mapped to a second external schema property. This step may be performed as described in step 850 or as otherwise described herein.

At step 870, a path from the directed graph is selected for implementing the first internal API request, wherein a node of the path corresponds to a first external API call. Any appropriate techniques may be used to select the path, such as any of the techniques described herein or in the applications incorporated by reference. In some implementations or instances, starting node of the path may be a node corresponding to the first internal schema property and/or the first external schema property, and an ending node of the path may be a node corresponding to the second internal schema property and/or the second external schema property.

In some instances, the directed may include more than one possible path for implementing the first internal API request. For example, a first path may implement the first internal API request using one external API call and a second path may implement the first internal API request using two external API calls. In some implementations, it may be desired to minimize the number of external API calls to be performed since a large number of external API calls may increase the time required to complete the internal API request and may increase the amount of required computational resources.

In some implementations, a cost may be computed for paths on the directed graph. Any appropriate cost functions may be used, such as combination of costs based on security, reliability, latency, or monetary costs. For example, a cost may be computed as the number of external API calls on the path or an expected latency. In selecting a path, where more than one path is possible, the path with the lowest cost may be selected.

In some implementations or instances, more than one internal schema property may be available and/or one or more internal schema properties may be needed. In such instances, the selected path may be connected to more than one of the available and/or needed internal schema properties. Accordingly, the selected path may include multiple branches. As used herein, a path includes a subgraph of a graph, where a subgraph of a graph is a connected subset of the nodes and edges of the graph One or more nodes on the path may correspond to actions to be performed. For example, a node on the path may correspond to an external API call, such as a first external API call. For another example, a node on the path may correspond to performing a computation, such as concatenating first name and a last name to compute a full name or to subtract an amount received from an amount due to compute a balance. For another example, a node on a path may correspond to executing programming statements, such as if-then-else statements or a for loop. For another example, a node on the path may correspond to retrieving information from a database, such as database 136.

The nodes may use any appropriate techniques to store a representation of the actions to be performed. In some implementations, the actions to be performed may be represented using structured text, such as JSON or XML. In some implementations, the nodes may store compiled software in binary format. In some implementations, the actions to be performed at a node may be represented as an abstract syntax tree (e.g., stored as structured text).

At step 880, the actions on the selected path are performed, including the first external API call. Any appropriate techniques may be used to perform the actions on the path. For example, the nodes of the path may be traversed using any appropriate graph navigation techniques. For each node, the representation of the actions at the node may be parsed and executed.

Performing the actions on the path may use the first value for the first internal schema property. For example, the first value may be an input to the first external API call or the first value may be used to compute another value that is an input to the first external API call. Performing the actions on the path may provide the second value for the second internal schema property. For example, the second value may be returned by the first external API call or the second value may be computed using another value returned by the first external API call.

At step 890, the first internal API call is completed using the second value. For example, the second value may be returned by the first internal API call or the second value may be stored in an appropriate location, such as a database.

In some implementations, dynamic API adaptation may be implemented as described in the following clauses, combinations of the following clauses, or in combination with other techniques described herein.

Clause 1. A computer-implemented method, comprising: obtaining a directed graph corresponding to an external API; receiving a first internal API request; determining that a first value for a first internal schema property is available; determining that a second value for a second internal schema property is needed to complete the first internal API request; obtaining the second value by: mapping the first internal schema property to a first external schema property, mapping the second internal schema property to a second external schema property, selecting a path from the directed graph wherein a node on the path corresponds to a first external API call of the external API, and performing the first external API call; and completing the first internal API request using the second value.

Clause 2. The computer-implemented method of clause 1, wherein receiving the first internal API request is in response to a customer service representative performing an action during a communications session with a user.

Clause 3. The computer-implemented method of clause 2, wherein the communications session comprises a phone call or a text chat.

Clause 4. The computer-implemented method of clause 1, wherein receiving the first internal API request is in response to a user performing an action on a website.

Clause 5. The computer-implemented method of clause 1, comprising: receiving a specification for the external API; and generating the directed graph using the specification.

Clause 6. The computer-implemented method of clause 1, wherein a starting node of the path corresponds to the first internal schema property and an ending node of the path corresponds to the second internal schema property.

Clause 7. The computer-implemented method of clause 1, wherein a starting node of the path corresponds to the first external schema property and an ending node of the path corresponds to the second external schema property.

Clause 8. The computer-implemented method of clause 1, comprising: obtaining a second directed graph corresponding to a second external API; receiving a second internal API request; determining that a third value for a third internal schema property is available; determining that a fourth value for a fourth internal schema property is needed to complete the second internal API request; obtaining the fourth value by: mapping the third internal schema property to a third external schema property, mapping the fourth internal schema property to a fourth external schema property, selecting a second path from the second directed graph wherein a second node on the second path corresponds to a second external API call of the second external API, and performing the second external API call; and completing the second internal API request using the fourth value.

Clause 9. The computer-implemented method of clause 1, comprising: receiving a second internal API request; determining that a third value for a third internal schema property is available; determining that a fourth value for a fourth internal schema property is needed to complete the second internal API request; obtaining the fourth value by: mapping the third internal schema property to a third external schema property, mapping the fourth internal schema property to a fourth external schema property, selecting a second path from the directed graph wherein a second node on the second path corresponds to a second external API call of the external API, and performing the second external API call; and completing the second internal API request using the fourth value.

Clause 10. The computer-implemented method of clause 1, wherein: determining that a third value for a third internal schema property is available; and mapping the third internal schema property to a third external schema property.

Clause 11. The computer-implemented method of clause 1, wherein: determining that a third value for a third internal schema property is needed to complete the first internal API request; and mapping the third internal schema property to a third external schema property.

Clause 12. The computer-implemented method of clause 1, wherein: a second node on the path corresponds to a second external API call; and performing the second external API call.

Clause 13. The computer-implemented method of clause 1, comprising: selecting a first domain corresponding to the external API from a plurality of domains; wherein the first internal API request is associated with the first domain.

Clause 14. The computer-implemented method of clause 1, wherein selecting the path comprises computing a cost for the path.

Clause 15. The computer-implemented method of clause 14, the cost is computed using a number of external API calls on the path.

Clause 16. The computer-implemented method of clause 1, comprising determining a mapping from the first internal schema property to a first external schema property using a first internal semantic representation of the first internal schema property and a first external semantic representation of the first external schema property.

Clause 17. The computer-implemented method of clause 1, wherein: the first internal API request is an API of a provider company; and the first external API call is an API of a company that is a customer of the provider company.

Clause 18. The computer-implemented method of clause 1, comprising generating computer code corresponding to actions on the path.

Clause 19. The computer-implemented method of clause 18, wherein the computer code comprises structured text.

Clause 20. The computer-implemented method of clause 18, wherein the computer code corresponds to an abstract syntax tree.

Clause 21. The computer-implemented method of clause 18, wherein the computer code is specified using functional programming.

Clause 22. A system comprising at least one computing device comprising at least one processor and at least one memory, the at least one computing device configured to implement the method of any of claims 1-21.

Clause 23. A device implementing the method of any of claims 1-21.

Clause 24. One or more non-transitory computer-readable media comprising computer executable instructions that, when executed, cause at least one processor to perform actions corresponding to the method of any of claims 1-21.

Figure 9:
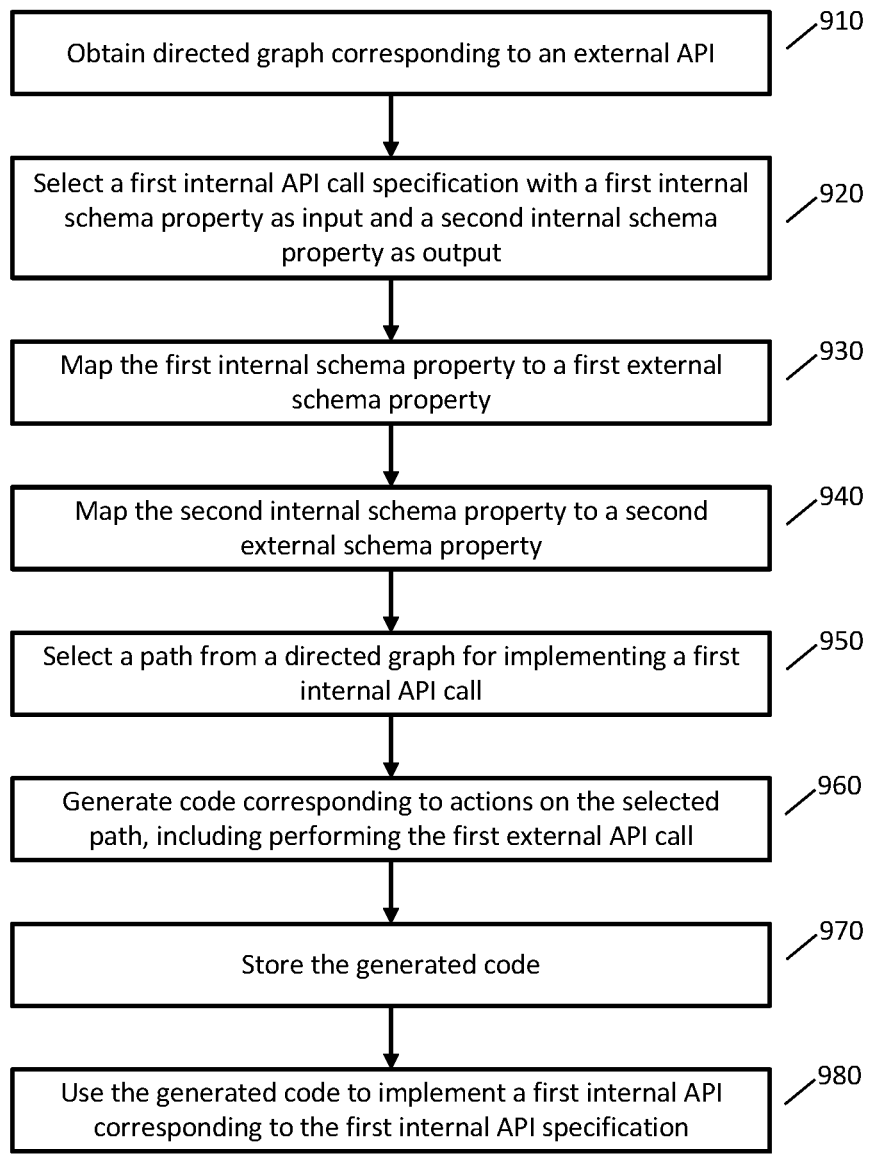
FIG. 9 is a flowchart of an example method for generating computer code for static adaption of internal API calls to external API calls.

FIG. 9 is a flowchart of an example method for generating computer code for static adaption of internal API calls to external API calls. The adaptation may be referred to as static adaptation because the adaptation may be performed in advance and stored for later use. Although the method below refers to external and internal APIs, the same techniques may be applied to a first API and a second API, and the first and second APIs need not have an external or internal relationship with each other or with respect to any entity. For example, the first and second APIs may both be internal APIs of a company.

At step 910, a directed graph corresponding to an external API is obtained. This step may be performed as described at step 810 or otherwise described herein.

At step 920, a first internal API call specification is selected. The first internal API call specification may include receiving one or more internal schema properties as input, such as a first internal schema property. The first internal API call specification may include providing one or more internal schema properties as output, such as a second internal schema property. The first internal API call specification may be selected using any appropriate techniques. For example, a list of internal API call specifications may be available, and the process of FIG. 9 may iterate over the list of internal API call specifications.

Steps 930 to 960 correspond to creating a first internal API call implementation corresponding to the first internal API call specification.

At step 930, the first internal schema property is mapped to a first external schema property, and at step 940, the second internal schema property is mapped to a second external schema property. Steps 930 and 940 may be performed as described at steps 850 and 860 or as otherwise described herein.

At step 950, a path from the directed graph is selected, wherein a node of the path corresponds to a first external API call. Step 950 may be performed as described at step 870 or as otherwise described herein.

At step 960, computer code is generated corresponding to actions on the selected path, wherein the actions include performing the first API call. The actions may include any actions described herein, such as the actions described at steps 870 and 880. As used herein, computer code includes any appropriate techniques for representing a sequence of instructions for processing by a computer. In some implementations, the generated code may correspond to an abstract syntax tree. In some implementations, the generated code may correspond to a functional programming language that performs operations by composing functions. The generated code may be represented in any appropriate format, such as structured text (e.g., JSON (JavaScript Object Notation) or XML (extensible markup language)), unstructured text, or a binary format. The following is an example representation of generating code using JSON:

```
{
    "body": [
        {
            "name": "customer_id",
            "type": "input"
        },
        {
            "dependencies": [
                "customer_id"
            ],
            "name": "customer_info",
            "operation_id": "getCustomerInfo",
            "host": "https://api.example.com",
            "type": "api"
        },
        {
            "dependencies": [
                "customer_info"
            ],
            "expression": {
                "value": {{customer_info.first_name+" "+customer_info.last_name}}
            },
            "name": "full_name",
            "type": "transform"
        }
    ],
    "input": [
        "customer_id"
    ],
    "name": "customer_full_name"
}
```

In the example JSON code above, the highest level objects include a body object, an input object, and a name object. The body object may include a sequence of actions or steps to be performed, as described in greater detail below. The input object may list the inputs to the code. In this example, the code has one input, but the code may receive more than one input. The name object may be used as the name of the code (e.g., similar to a function name) or may be used as an identifier of the output of the code. The output of the code may also be represented as JSON so that the code may output lists or objects.

The body object may include a list of action or step objects to be executed. Although the body object includes a list of action objects, this list may represent a more complex data structures, such as a tree or a directed graph. For example, a tree or directed graph may be represented as a list of nodes where each node indicates its parent and child nodes. In the above example, an action object may have dependencies to indicate the inputs of the action object relative to the other action objects. An action object may also have a name so that other action objects can use that name to indicate the action object as a dependency.

In the above example, the first action object has a type of "input." This action object may assign a name to the first input to the code. Where the code receives more than one input, multiple action objects may be used to assign names to the inputs. Because the action object has a type of input, it may not have any dependencies.

The second action object has a type of "api" since the action performs an API call, such as the external API calls described herein. The API action object lists the customer_id action object as a dependency because the customer_id is an input that is used for performing the API call. The details of implementing the API object may be specified using any appropriate techniques. For example, the host property and the operation_id property may be combined to generate a URL for the API call (such as https://api.example.com/getCustomerInfo). The customer_id may be passed to the API call using any appropriate techniques, such as a URL parameter or as the contents of a POST.

The third action object has a type of "transform" because it performs computations or operations on the input. The transform object receives the results of the API call, which may be a JSON object that includes information about the customer. For example, a customer information JSON object may have a first_name property and a last_name property. The transform object may have an expression property the defines the operation or computations to be performed. In this example, the operation is to concatenate the first name, a space, and the last name, where addition of strings may correspond to concatenation in some programming languages. The output of the expression may be the output of the third object. Because the third action object is the last action object of the body of the code, the output of the third action object may also be the output of the code.

In the above example, the inputs and outputs of the code may correspond to either internal schema properties or to external schema properties. For example, where the internal schema properties are mapped to external schema properties before executing the code, the inputs and outputs of the code may correspond to external schema properties. By contrast, the code may instead correspond to internal schema properties as inputs and outputs, and the mapping between internal and external schema properties may be performed by the code itself.

At step 970, the generated code is stored. The generated code may be stored in any appropriate location in any appropriate format. For example, the generated code may be stored in a database as structured text.

At step 980, the generated code is retrieved from storage and used to adapt an internal API call to an external API call. For example, the generated code may be used to adapt any of the internal API calls described herein.

The processing of FIG. 9 may be repeated to generate code for additional internal API call specifications. For example, a list of internal API call specifications may be provided, and the process of FIG. 9 may be performed for each of the internal API call specifications.

Figure 10:
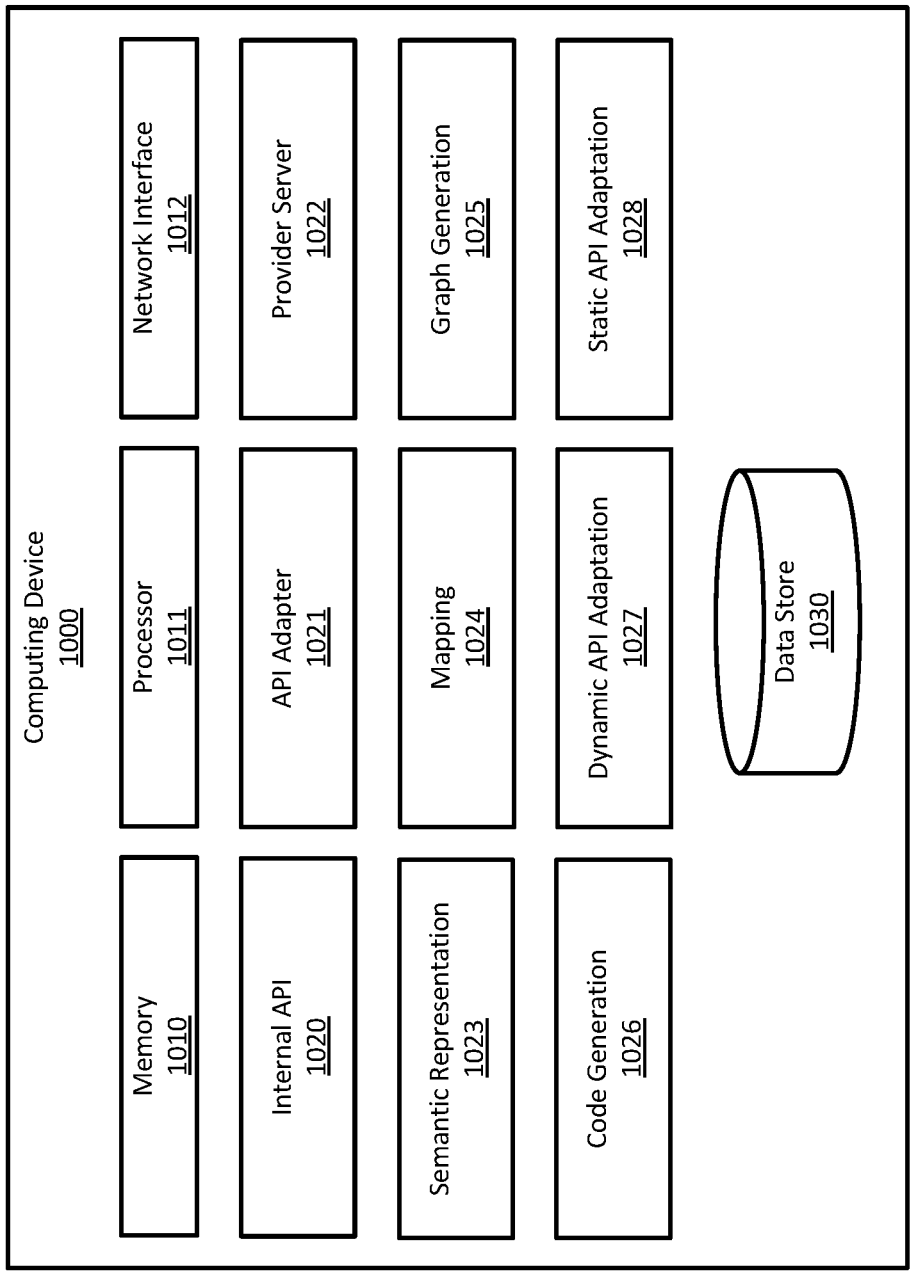
FIG. 10 illustrates components of one implementation of a computing device for implementing any of the techniques described herein.

FIG. 10 illustrates components of one implementation of a computing device 1000 for implementing any of the techniques described herein. In FIG. 10, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Computing device 1000 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 1000 may have an internal API component 1020 that may receive internal API calls and provide results using any of the techniques described herein. Computing device 1000 may have an API adapter component 1021 that may adapt internal API calls to external API calls using any of the techniques described herein. Computing device 1000 may have a provider server component 1022 that may provide services to companies using any of the techniques described herein. Computing device 1000 may have a semantic representation component 1023 that may compute a semantic representation of a schema property or schema entity using any of the techniques described herein. Computing device 1000 may have a mapping component 1024 that may map between internal and external schema properties using any of the techniques described herein. Computing device 1000 may have a graph generation component 1025 that may generate a directed graph from API documentation or an API schema using any of the techniques described herein. Computing device 1000 may have a code generation component 1026 that may generate code for adapting an internal API call to an external API call using any of the techniques described herein. Computing device 1000 may have a dynamic API adaptation component 1027 that may dynamically adapt an internal API call to an external API call using any of the techniques described herein. Computing device 1000 may have a static API adaptation component 1028 that may statically adapt an internal API call to an external API call using any of the techniques described herein.

Computing device 1000 may include or have access to various data stores. Data stores may use any known storage technology such as files, relational databases, non-relational databases, or any non-transitory computer-readable media. Computing device 1000 may have a data store 1030 that stores generated code or other data for a provider to provide services to companies using any of the techniques described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
   obtaining a directed graph corresponding to an external API;
   selecting a first internal API call specification for a first internal API call of an internal API, wherein the first internal API call specification comprises:
      receiving a first value corresponding to a first internal schema property as input, and
      providing a second value corresponding to a second internal schema property as output;
   creating a first internal API call implementation by:
      mapping the first internal schema property to a first external schema property,
      mapping the second internal schema property to a second external schema property,
      selecting a path from the directed graph for implementing the first internal API call, wherein a node on the path corresponds to a first external API call of the external API, wherein selecting the path comprises computing a cost for the path, and wherein the cost is computed using a number of external API calls on the path, and
      generating computer code corresponding to actions of nodes of the path, wherein the computer code performs the first external API call of the external API; and
   storing the computer code.

2. The computer-implemented method of claim 1, wherein a starting node of the path corresponds to the first internal schema property and an ending node of the path corresponds to the second internal schema property.

3. The computer-implemented method of claim 1, wherein a starting node of the path corresponds to the first external schema property and an ending node of the path corresponds to the second external schema property.

4. The computer-implemented method of claim 1, wherein:
   a second node on the path corresponds to a second external API call; and
   the computer code performs the second external API call.

5. The computer-implemented method of claim 1, wherein the computer code corresponds to an abstract syntax tree.

6. The computer-implemented method of claim 1, wherein the computer code is specified using functional programming.

7. A system, comprising at least one computing device comprising at least one processor and at least one memory, the at least one computing device configured to:
   obtain a directed graph corresponding to an external API;
   select a first internal API call specification for a first internal API call of an internal API, wherein the first internal API call specification comprises:
      receiving a first value corresponding to a first internal schema property as input, and
      providing a second value corresponding to a second internal schema property as output;
   create a first internal API call implementation by:
      mapping the first internal schema property to a first external schema property,
      mapping the second internal schema property to a second external schema property,
      selecting a path from the directed graph for implementing the first internal API call, wherein a node on the path corresponds to a first external API call of the external API, wherein selecting the path comprises computing a cost for the path, and wherein the cost is computed using a number of external API calls on the path, and
      generating computer code corresponding to actions of nodes of the path, wherein the computer code performs the first external API call of the external API; and
   store the computer code.

8. The system of claim 7, wherein the at least one computing device is configured to:
   obtain a second directed graph corresponding to a second external API;
   create a second internal API call implementation by:
      mapping the first internal schema property to a third external schema property of the second external API,
      mapping the second internal schema property to a fourth external schema property of the second external API, selecting a second path from the second directed graph where in a second node on the second path corresponds to a second external API call of the second external API, and generating second computer code corresponding to second actions of second nodes of the second path, wherein the second actions comprise performing the second external API call of the second external API; and store the second computer code.

9. The system of claim 7, wherein the at least one computing device is configured to:

select a second internal API call specification for a second internal API call, wherein the second internal API call specification comprises:

receiving a third value corresponding to a third internal schema property as input, and providing a fourth value corresponding to a fourth internal schema property as output;

create a second internal API call implementation by:

mapping the third internal schema property to a third external schema property, mapping the fourth internal schema property to a fourth external schema property, selecting a second path from the directed graph where in a second node on the second path corresponds to a second external API call of the external API, and generating second computer code corresponding to second actions of second nodes of the second path, wherein the second actions comprise performing the second external API call of the external API; and store the second computer code.

10. The system of claim 7, wherein:

the internal API is an API of a provider company; and the external API is an API of a company that is a customer of the provider company.

11. The system of claim 7, wherein the computer code comprises structured text.

12. The system of claim 7, wherein the at least one computing device is configured to use the computer code to implement the first internal API call in production.

13. The system of claim 7, wherein the at least one computing device is configured to determine a mapping from the first internal schema property to a first external schema property using a first internal semantic representation of the first internal schema property and a first external semantic representation of the first external schema property.

14. The system of claim 7, wherein the at least one computing device is configured to:

receive a specification for the external API; and generate the directed graph using the specification.

15. One or more non-transitory, computer-readable media comprising computer-executable instructions that, when executed, cause at least one processor to perform actions comprising:

obtaining a directed graph corresponding to an external API;

selecting a first internal API call specification for a first internal API call of an internal API, wherein the first internal API call specification comprises:

receiving a first value corresponding to a first internal schema property as input, and providing a second value corresponding to a second internal schema property as output;

creating a first internal API call implementation by:

mapping the first internal schema property to a first external schema property, mapping the second internal schema property to a second external schema property, selecting a path from the directed graph for implementing the first internal API call, wherein a node on the path corresponds to a first external API call of the external API, wherein selecting the path comprises computing a cost for the path, and wherein the cost is computed using a number of external API calls on the path, and generating computer code corresponding to actions of nodes of the path, wherein the computer code performs the first external API call of the external API; and storing the computer code.

16. The one or more non-transitory, computer-readable media of claim 15, wherein:

the first internal API call specification comprises receiving a third value corresponding to a third internal schema property as input; and creating a first internal API call implementation comprises mapping the third internal schema property to a third external schema property.

17. The one or more non-transitory, computer-readable media of claim 15, wherein:

the first internal API call specification comprises providing a third value corresponding to a third internal schema property as output; and creating the first internal API call implementation comprises mapping the third internal schema property to a third external schema property.

18. The one or more non-transitory, computer-readable media of claim 15, wherein the actions comprise:

selecting a first domain corresponding to the external API from a plurality of domains;

wherein the first internal API call specification is associated with the first domain.

* * * * *